(12) United States Patent
Whitsett

(10) Patent No.: US 12,495,766 B2
(45) Date of Patent: Dec. 16, 2025

(54) PET SHOWER INCLUDING COLLAPSIBLE UPPER WASHING STATION AND INTERIOR SUPPORT FRAME

(71) Applicant: Leon Whitsett, Detroit, MI (US)

(72) Inventor: Leon Whitsett, Detroit, MI (US)

( * ) Notice: Subject to any disclaimer, the term of this patent is extended or adjusted under 35 U.S.C. 154(b) by 5 days.

(21) Appl. No.: 18/438,786

(22) Filed: Feb. 12, 2024

(65) Prior Publication Data

US 2024/0215536 A1    Jul. 4, 2024

Related U.S. Application Data

(63) Continuation-in-part of application No. 18/206,671, filed on Jun. 7, 2023, now abandoned, and a continuation-in-part of application No. 17/147,046, filed on Jan. 12, 2021, now abandoned, and a continuation-in-part of application No. 14/018,416, filed on Sep. 5, 2013, now abandoned.

(51) Int. Cl.
    *A01K 13/00*    (2006.01)

(52) U.S. Cl.
    CPC .................. *A01K 13/001* (2013.01)

(58) Field of Classification Search
    CPC .................. A01K 13/00; A01K 13/001
    USPC .................. 119/600, 650, 671, 673, 678
    See application file for complete search history.

(56) References Cited

U.S. PATENT DOCUMENTS

| | | | | |
|---|---|---|---|---|
| 3,884,191 A | * | 5/1975 | Stout | A01K 13/001 119/671 |
| 3,985,102 A | * | 10/1976 | Yonezawa | A01K 13/001 219/400 |
| 4,020,796 A | * | 5/1977 | Grifa | A01K 13/001 119/671 |
| 4,057,032 A | * | 11/1977 | Dimitriadis | A61D 11/00 119/671 |
| 4,083,328 A | * | 4/1978 | Baker | A01K 13/001 119/673 |
| 4,437,714 A | * | 3/1984 | Struck | A47B 69/00 312/272 |
| 4,527,511 A | * | 7/1985 | Richards | A01K 1/011 119/673 |
| 4,559,903 A | * | 12/1985 | Bloom | A01K 13/001 219/400 |
| 4,930,453 A | * | 6/1990 | Laliberte | A01K 13/001 312/1 |
| 5,243,931 A | * | 9/1993 | McDonough | A01K 13/001 119/676 |
| 5,283,962 A | * | 2/1994 | Humann | F26B 9/006 119/482 |
| 5,329,878 A | * | 7/1994 | McCauley | A01K 1/0107 119/673 |

(Continued)

*Primary Examiner* — Brady W Frazier

(57) ABSTRACT

The present invention provides an animal bathing apparatus having an upper washing station supported by a base with a plurality of legs. The upper washing station includes a plurality of walls, which are selectively collapsible into a storage position, and the plurality of legs are selectively removable to enable easy transport and storage of the animal washing apparatus. The upper washing station includes an access portal to define an ingress and egress for an animal, as well as a selectively removable screen and glove box. A fluid port allows attachment of a water hose and shower head for use within an interior washing area.

14 Claims, 4 Drawing Sheets

(56) References Cited

U.S. PATENT DOCUMENTS

| | | | | |
|---|---|---|---|---|
| 5,632,231 A * | 5/1997 | Moore | A01K 13/001; D30/123 |
| 5,662,069 A * | 9/1997 | Smith | A01K 13/001; 119/673 |
| 5,794,570 A * | 8/1998 | Foster | A01K 13/001; 119/673 |
| 5,926,866 A * | 7/1999 | Chao | A47K 3/024; 4/575.1 |
| 7,107,937 B1 * | 9/2006 | Anderson | A01K 13/001; 119/665 |
| 8,061,304 B1 * | 11/2011 | Ramsay | A01K 13/001; 119/673 |
| 8,069,821 B1 * | 12/2011 | Green | A01K 13/001; 119/673 |
| 8,186,307 B2 * | 5/2012 | Moharram | A01K 13/001; 119/671 |
| 8,413,610 B1 * | 4/2013 | Fultz | A01K 13/001; 119/665 |
| 11,968,959 B2 * | 4/2024 | Zhou | A01K 13/001 |
| 2002/0100426 A1 * | 8/2002 | Balto | A61D 3/00; 119/416 |
| 2003/0000482 A1 * | 1/2003 | Batterton | A01K 13/001; 119/650 |
| 2006/0102096 A1 * | 5/2006 | Cho | A01K 13/001; 119/671 |
| 2006/0102097 A1 * | 5/2006 | Price | A01K 13/001; 119/671 |
| 2007/0074674 A1 * | 4/2007 | Miller | A01K 13/001; 119/671 |
| 2007/0289548 A1 * | 12/2007 | Smoot | A01K 13/001; 119/668 |
| 2008/0129164 A1 * | 6/2008 | Walsh | A47F 3/0486; 312/228.1 |
| 2011/0017147 A1 * | 1/2011 | Petruzzi | A01K 13/001; 119/671 |
| 2012/0279456 A1 * | 11/2012 | Caldwell | A01K 13/001; 119/676 |
| 2020/0128788 A1 * | 4/2020 | Zheng | A01K 15/04 |
| 2023/0189758 A1 * | 6/2023 | Zhou | A01K 13/001; 119/673 |
| 2023/0255180 A1 * | 8/2023 | Liu | A01K 13/001; 119/600 |

\* cited by examiner

PET SHOWER INCLUDING COLLAPSIBLE UPPER WASHING STATION AND INTERIOR SUPPORT FRAME

CROSS REFERENCE TO RELATED APPLICATIONS

This application is a continuation-in-part of co-pending U.S. patent application Ser. No. 18/206,671, filed on Jun. 7, 2023, the disclosure of which is hereby incorporated by reference in its entirety, including the drawing, which application in turn, is a continuation-in-part of U.S. patent application Ser. No. 17/147,046, filed Jan. 12, 2021, and a continuation-in-part of now abandoned U.S. patent application Ser. No. 14/018,416, filed Sep. 5, 2013, the disclosures of which are hereby incorporated by reference in their entireties, including the drawings.

PRIOR ART

Household pets, such as those with fur, often become dirty or odorous and require washing or bathing to maintain their hygiene, particularly when the pet lives indoors with humans. However, this task may be difficult when done in the home due to the lack of a proper area to perform the washing. Professional services to wash and groom an animal may be available but are often costly and not always readily available when the washing is required. Accordingly, while conventional and professional pet washing methods work well for their intended purpose, there remains a desire for improvement in the relevant art.

BACKGROUND OF THE INVENTION

The present application relates generally to a washing apparatus and, more particularly, to a pet shower-type washing apparatus for dogs and other animals.

SUMMARY OF THE INVENTION

In a first aspect of the present invention, a portable shower is provided herein. The shower includes upper and lower sections.

The upper section is the shower section, and the lower section is a stand. The upper section is formed from a durable, lightweight fabric with access portals to facilitate washing the animal.

For a more complete understanding of the present invention, reference is made to the following detailed description and accompanying drawing, wherein like reference numerals refer to like features throughout the several views of the drawings.

DETAILED DESCRIPTION OF THE INVENTION

As noted above, the present application is directed to a pet shower apparatus having improved air circulation, water delivery and discharge, as well as ease of manufacture and portability. The pet bathing apparatus may be folded or partially disassembled for easy transport and storage, and quickly deployed to function as a bathing station or pet crate.

Figure 1:
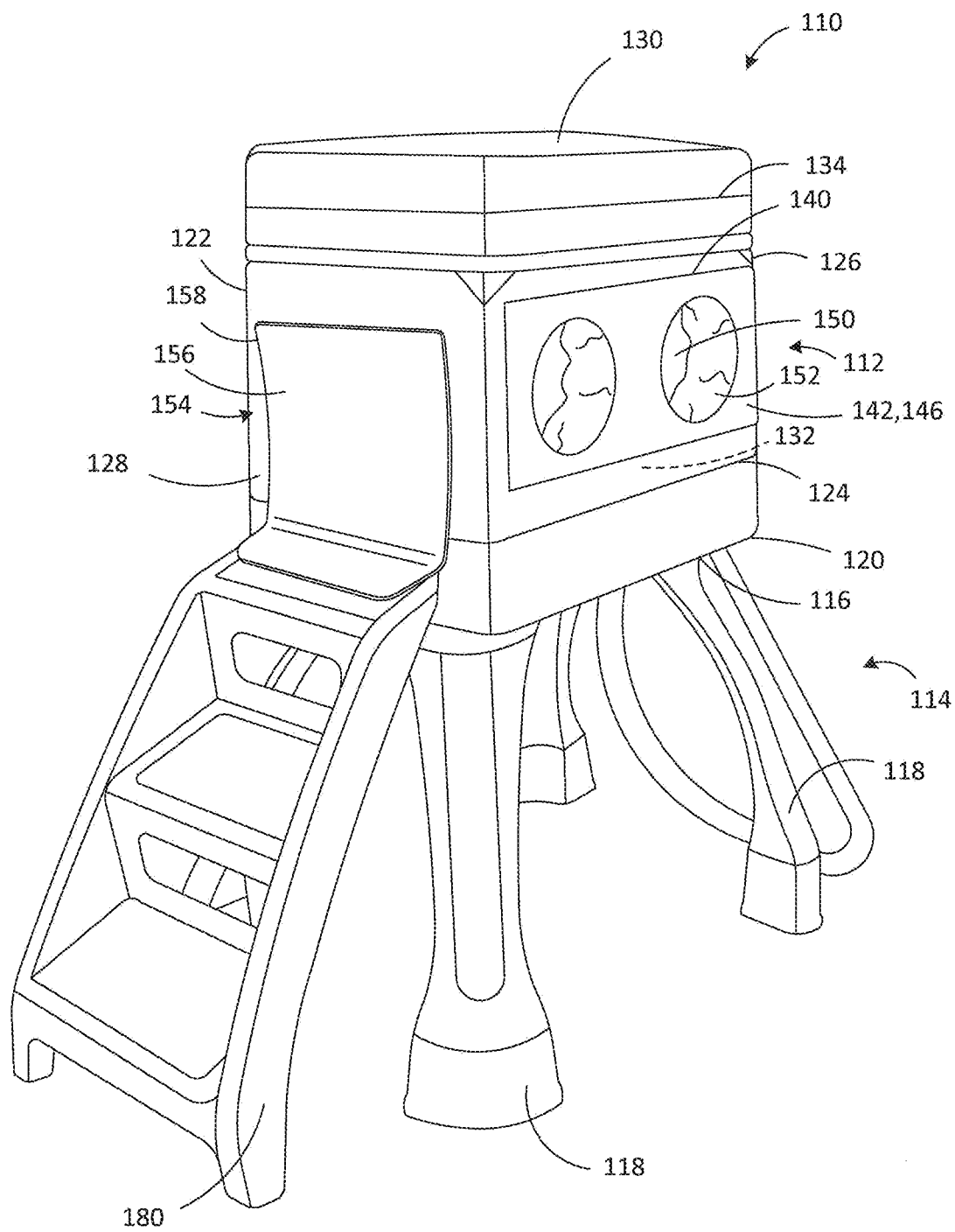
FIG. 1 is a front perspective view of a first embodiment animal washing apparatus of the present disclosure.
Figure 2:
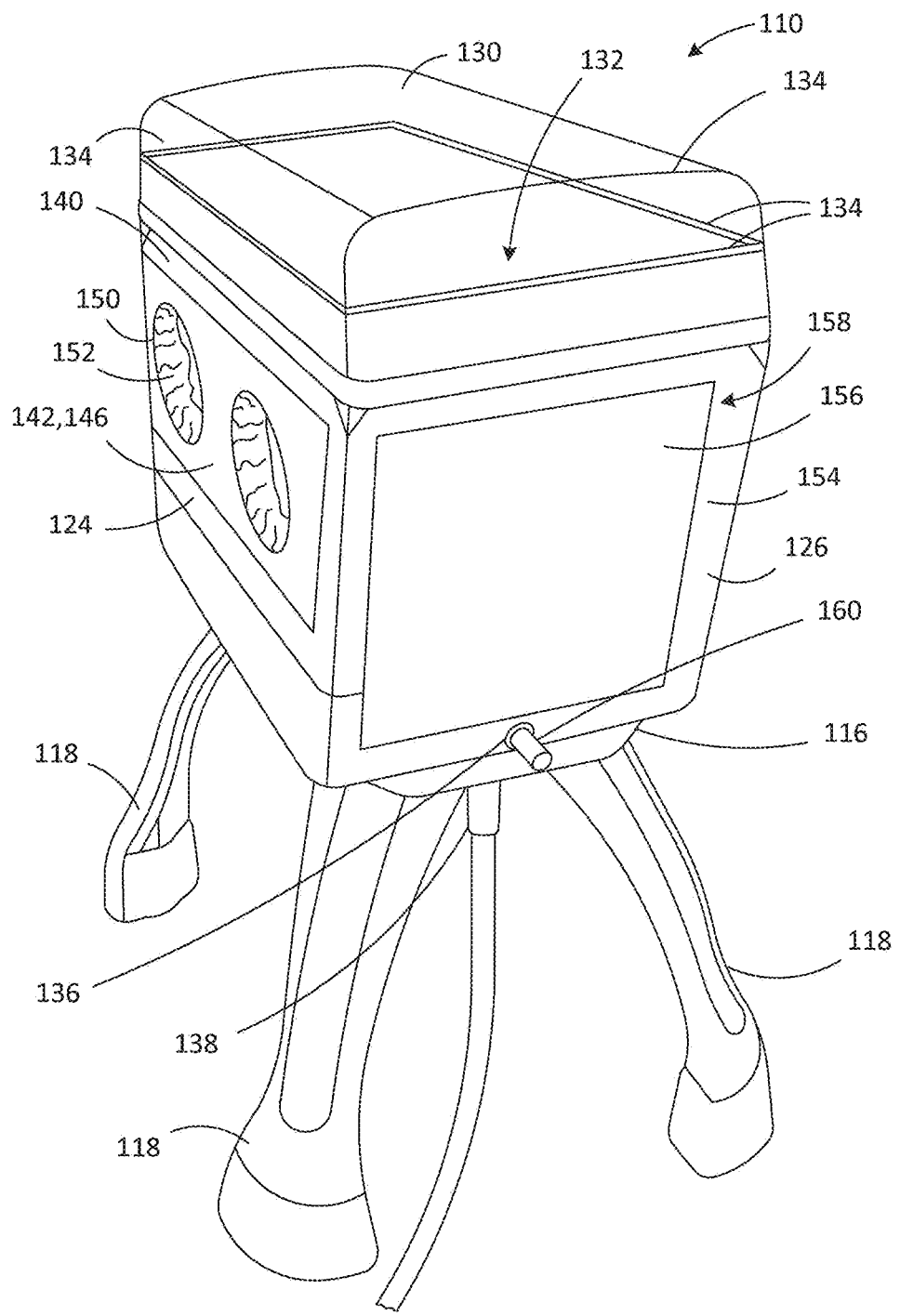
FIG. 2 is a rear perspective view of the animal washing apparatus shown in FIG. 1.
Figure 4:
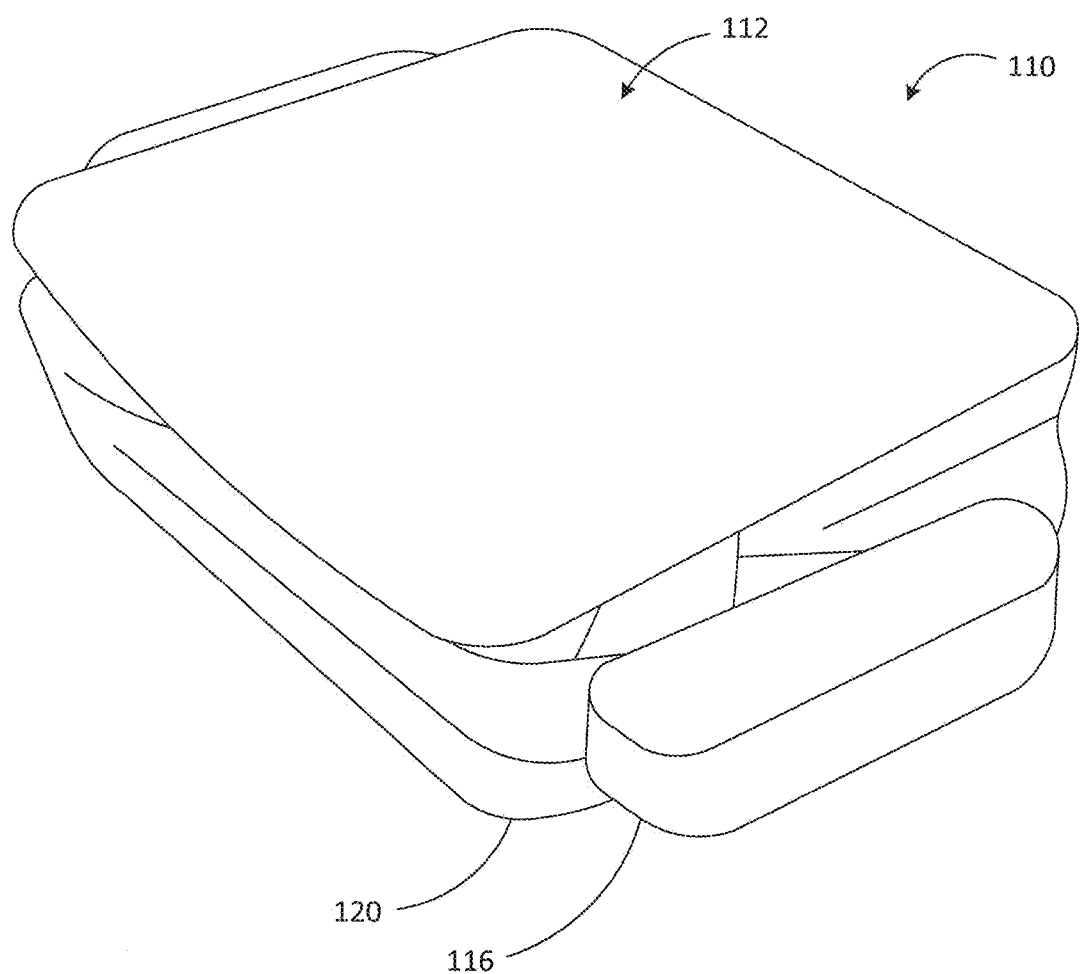
FIG. 4 is a perspective view of the animal washing apparatus in a collapsed storage position.

With more particularity and referring now to the drawings and, in particular, FIGS. 1, 2 and 4, a pet bathing or washing or showering apparatus 110 is formed in accordance with a first embodiment hereof. In this embodiment, the pet bathing apparatus 110 generally comprises (a) an upper washing station or compartment 112 and (b) a lower portion or base 114. The upper washing compartment 112 is detachably secured to the base 114. The base 114 generally includes a support platform 116 with four downwardly extending legs or stanchions 118 that enable the upper washing compartment 112 to be safely positioned either on the ground or on a suitable surface, and may be removably secured thereto.

Additionally, the legs 118 are preferably removably coupled to the support platform 116 for easy set up and storage. As shown, the legs 118 are disposed at each corner of the support platform 116 to impart stability thereto.

It should be noted that the upper compartment may be used independently from the legs and be deployed as a table top version, or the like.

The upper washing compartment 112, generally, has a substantially rectangular configuration including an integrally formed bottom wall 120, opposed first and second side walls 122, 124, an opposed rear wall 126 and front wall 128, and a top 130. In this way, the upper washing compartment 112 defines an interior washing area 132 to receive an animal for washing thereof. The upper washing compartment 112 is formed from a fabric or other pliable material such that the upper washing compartment 112 may be collapsed or folded flat (e.g., see FIG. 4) for storage or transport.

When deployed, the interior washing area 132 is configured to receive a frame 134 to provide a support structure to hold the upper washing compartment 112 in the deployed position. The frame 134 may integrated into the upper washing compartment 112, for example, being part of the one or more walls or attached to an interior surface thereof. The frame 134 is movable from a deployed position that provides a skeleton or support frame for the upper washing compartment 112, to a retracted position that enables the upper washing compartment 112 to be folded or collapsed unto itself. Alternatively, the frame 134 may be a separate component, which is subsequently inserted into the interior washing area 132 when desired.

Preferably, the bottom wall 120 is fabricated from a substantially rigid material configured to support an animal when inside the interior washing area 132. The bottom wall 120 is configured to removably couple to the support platform 116 of the base 114 for easy set up and storage. Alternatively, the support platform 116 and the bottom wall 120 may be one and the same.

The bottom wall 120 and/or the support platform 116 includes an inclined bottom surface which is inclined or tapered toward a portion thereof (e.g., a center, toward the rear wall 126, etc.). A drainage opening 136 is provided therein which is configured to attach to a drain hose 138 (FIG. 2) to drain any liquid from the interior washing area 132. The drainage opening 136 may be sealingly closed, via a plug (not shown), or the like, during use and which can be opened to drain any liquid from the interior washing area 132.

Figure 3:
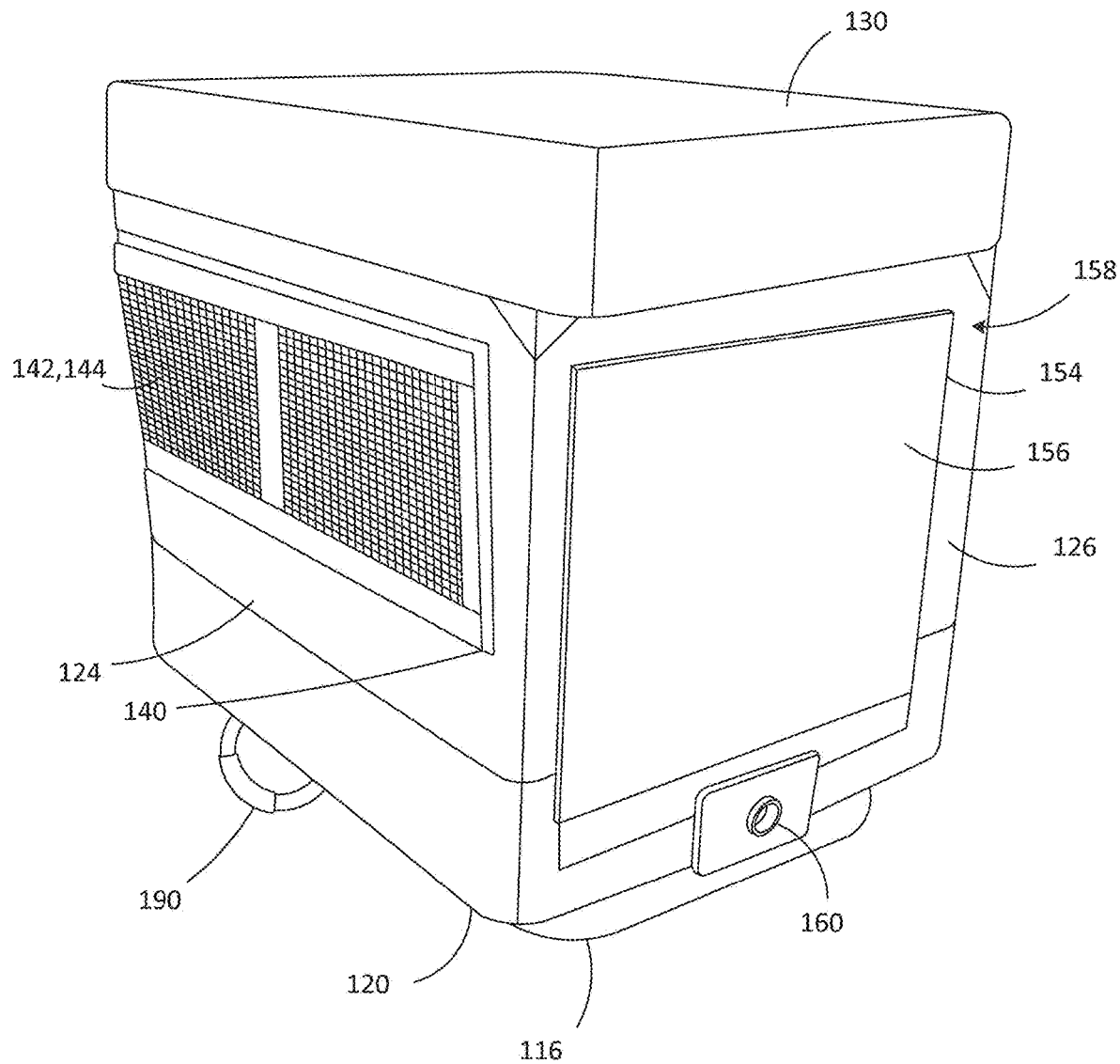
FIG. 3 is a rear perspective view of another embodiment of the animal washing apparatus.

The opposed first and second side walls 122, 124 are attached to and extend upwardly from the bottom wall 120. Each of the side walls 122, 124 may include a generally rectangular aperture or window 140 configured to selectively receive an accessory 142 such as, for example, as shown in FIG. 3, a screen 144 or glove box 146. The accessory 142 is configured to removably couple to the side wall 122, 124 to fit in or over the window 140. In one example, the accessory 142 is removably coupled to a perimeter of the window 140 via zipper, hook and pile, or any other suitable means or may be integral with the wall.

As shown in FIG. 3, the screen 144, which is optional, encloses the window 140, for example, to prevent egress of the animal, but also includes a meshing 148 with a plurality of openings to enable ventilation and airflow therethrough. The screen 144, where used, may be non-removable and integrated into the side wall 122, 124.

As shown in FIG. 1, the glove box 146 encloses the window 140 and includes a pair of openings 150 each with a waterproof liner or glove 152 to enable the hands and/or arms of the user to access the interior washing area 132 and wash the animal or perform other tasks without allowing water, soap, etc. to pass through the window 140.

The opposed rear wall 126 and front wall 128 are attached to and extend upwardly from the bottom wall 120. The rear wall 126 and front wall 128 are also coupled to and extend between the ends of the first and second side walls 122, 124. At least one of the rear wall 126 and/or front wall 128 includes an opening or access portal 154, which enables access into the interior washing area 132, as described below.

The access portal 154 includes an associated door 156, which may be apertured/screened for ventilation. The door 156 may be detachably and/or hingedly connected to a perimeter edge 158 of the access portal 154, for example via a zipper or a hook and pile arrangement. The door 156 may be complimentarily configured to the dimensions of the rear or front wall 126, 128 and may be defined by the geometry of the portals 154, as shown.

The top 130 is attached to and extends between an upper edge of the first and second side walls 122, 124, the rear wall 126, and the front wall 128. As shown in FIG. 1, the top 130 may form a dome-like structure over the interior washing area 132. In some configurations, the top 130 may be fabricated from a transparent material to enable the user to easily see into the interior washing area 132. Moreover, the top 130 may be removably coupled to the side walls 122, 124, rear wall 126, and front wall 128, for example, via a zipper or a hook and pile arrangement.

As shown in FIGS. 2 and 3, a fluid port 160 is formed in the rear wall 126 which is configured for attachment of a fluid hose 162 to provide a washing liquid (e.g., water) into the interior washing area 132. The fluid port 160 is a fluid connection for a standard garden hose, or similar source.

Although not shown, the opposite end of the fluid port 160, which is disposed in the interior washing area 132, may also include a coupling for fluidly coupling to a washing accessory such as a shower head or nozzle to assist during the animal washing event. It will be appreciated that the fluid port 160 may be located in any suitable area that enables the pet bathing apparatus 110 to function as described herein. For example, the fluid port 160 may be located in the bottom wall 120, side walls 122, 124, or front wall 128.

As shown in FIG. 1, a stepped ramp 170 may be used to enable the animal to climb upon to enter though the access portal 150 into the interior washing area 132. The ramp 170 preferably detachably mounts to the lower base 114 and/or the bottom wall 120.

As shown in FIG. 4, the upper washing station 112 is selectively foldable or collapsible down on the bottom wall 120 and base 114. The four legs 118 may then be detached from the base 114. In this way, the pet bathing apparatus 110 is transformable into a smaller package for transport and storage. Additionally, one or more straps 190 (FIG. 3) may be provided or attached to the pet bathing apparatus 110 to secure the system in the shown storage/transport position.

The present device can be manufactured from any suitable material, such as polyester, nylon, and/or a synthetic resinous material like light-weight polypropylene or other plastic.

From the foregoing, it is apparent that there has been described an animal washing device that is easy to use, inexpensive to manufacture, and readily transportable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An animal bathing apparatus, comprising:
   (a) an upper washing station having a bottom wall, a front wall, a rear wall, a pair of opposed side walls, and a top portion that cooperate to define an interior washing area, wherein the top portion is attached to an upper edge of the front wall, the rear wall, and the opposed side walls, wherein the opposed side walls, the front wall, and the rear wall are fabricated from a pliable material that enables the opposed side walls, the front wall, and the rear wall to be collapsable onto the bottom wall for transportation or storage;
   (b) a frame configured to be disposed within the interior washing area at least partially between an upper surface of the top portion and the upper edges of the front wall, the rear wall, and the opposed side walls to support the opposed side walls, the front wall, and the rear wall in an upright deployed position;
   (c) an access portal formed in at least one of the front wall or the rear wall to enable ingress and egress of an animal into the interior washing area; and
   (d) a base configured to support and removably couple to the upper washing station, the base including a plurality of selectively removable legs.

2. The animal bathing apparatus of claim 1, wherein the frame is integrated into the opposed sidewalls, the front wall, or the rear wall.

3. The animal bathing apparatus of claim 1, wherein the frame is removable from the interior washing area to facilitate folding the opposed side walls, the front wall, and the rear wall down onto the bottom wall.

4. The animal bathing apparatus of claim 1, wherein the top portion comprises a transparent material.

5. The animal bathing apparatus of claim 1, further comprising a window formed in at least one of the side walls.

6. The animal bathing apparatus of claim 5, further comprising a screen configured to removably couple to the side wall over the window.

7. The animal bathing apparatus of claim 5, further comprising a glove box configured to removably couple to the side wall over the window.

8. The animal bathing apparatus of claim 7, wherein the glove box includes at least one opening with a waterproof glove to enable a hand and arm of a user to access the interior washing area.

9. The animal bathing apparatus of claim 1, further comprising a drainage opening formed in the bottom wall, the drainage opening configured to drain water away from the interior washing area.

10. The animal bathing apparatus of claim 1, further comprising a fluid port configured to attach to a hose to provide a washing liquid into the interior washing area.

11. The animal bathing apparatus of claim 10, further comprising a shower head or nozzle fluidly coupled to the fluid port.

12. The animal bathing apparatus of claim 1, wherein the fluid port is coupled to the rear wall or one of the opposed sidewalls.

13. The animal bathing apparatus claim 1, further comprising a door coupled to the at least one of the front wall or the rear wall and configured to selectively enclose the access portal.

14. The animal bathing apparatus of claim 1, further comprising a ramp detachably connected to the upper washing station and/or the base for facilitating ingress and egress by an animal into or out of the interior washing area.

* * * * *